(12) United States Patent
Seibert, Jr. et al.

(10) Patent No.: US 9,727,448 B1
(45) Date of Patent: Aug. 8, 2017

(54) METHOD AND SYSTEM FOR SOFTWARE APPLICATION TESTING RECOMMENDATIONS

(71) Applicant: Google Inc., Mountain View, CA (US)

(72) Inventors: Jeffrey Seibert, Jr., San Francisco, CA (US); Wayne Chang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/693,438

(22) Filed: Apr. 22, 2015

(51) Int. Cl.
G06F 11/00 (2006.01)
G06F 11/36 (2006.01)

(52) U.S. Cl.
CPC ...... G06F 11/3676 (2013.01); G06F 11/3692 (2013.01)

(58) Field of Classification Search
CPC .................................................. G06F 11/3676
See application file for complete search history.

(56) References Cited

U.S. PATENT DOCUMENTS

| | | | | |
|---|---|---|---|---|
| 6,748,584 | B1 * | 6/2004 | Witchel | G06F 8/71 714/37 |
| 8,707,264 | B2 * | 4/2014 | Hossain | G06F 11/3672 717/124 |
| 9,087,156 | B2 * | 7/2015 | Patton | G06F 11/3688 |
| 2009/0183143 | A1 * | 7/2009 | Li | G06F 11/3414 717/126 |
| 2011/0238613 | A1 * | 9/2011 | Shehory | G06F 11/3664 706/52 |
| 2012/0047492 | A1 * | 2/2012 | Huang | G06F 8/60 717/128 |
| 2012/0291014 | A1 * | 11/2012 | Shrinivasan | G06F 11/3664 717/124 |
| 2014/0096111 | A1 * | 4/2014 | Mahler | G06F 11/3676 717/124 |
| 2015/0007138 | A1 * | 1/2015 | Sabetta | G06F 11/3684 717/124 |
| 2015/0254165 | A1 * | 9/2015 | Baril | G06F 11/3676 714/38.1 |
| 2015/0347278 | A1 * | 12/2015 | Sinha | G06F 11/3676 714/38.1 |

* cited by examiner

*Primary Examiner* — Philip Guyton
(74) *Attorney, Agent, or Firm* — Fish & Richardson P.C.

(57) ABSTRACT

A method for application testing recommendation includes deploying a software application to first testers having first system configurations, and receiving testing coverage data describing (i) a first subset of features of the software application being tested by the first testers and (ii) information describing the first system configurations. The method further includes deploying the software application to a marketplace, and receiving market coverage data describing (i) a second subset of features being used by market users and (ii) second system configurations of the market users. The method further includes comparing the market coverage data and the testing coverage data to identify a coverage discrepancy, selecting second testers to test the software application based on the coverage discrepancy, and deploying the software application to the second testers.

19 Claims, 7 Drawing Sheets

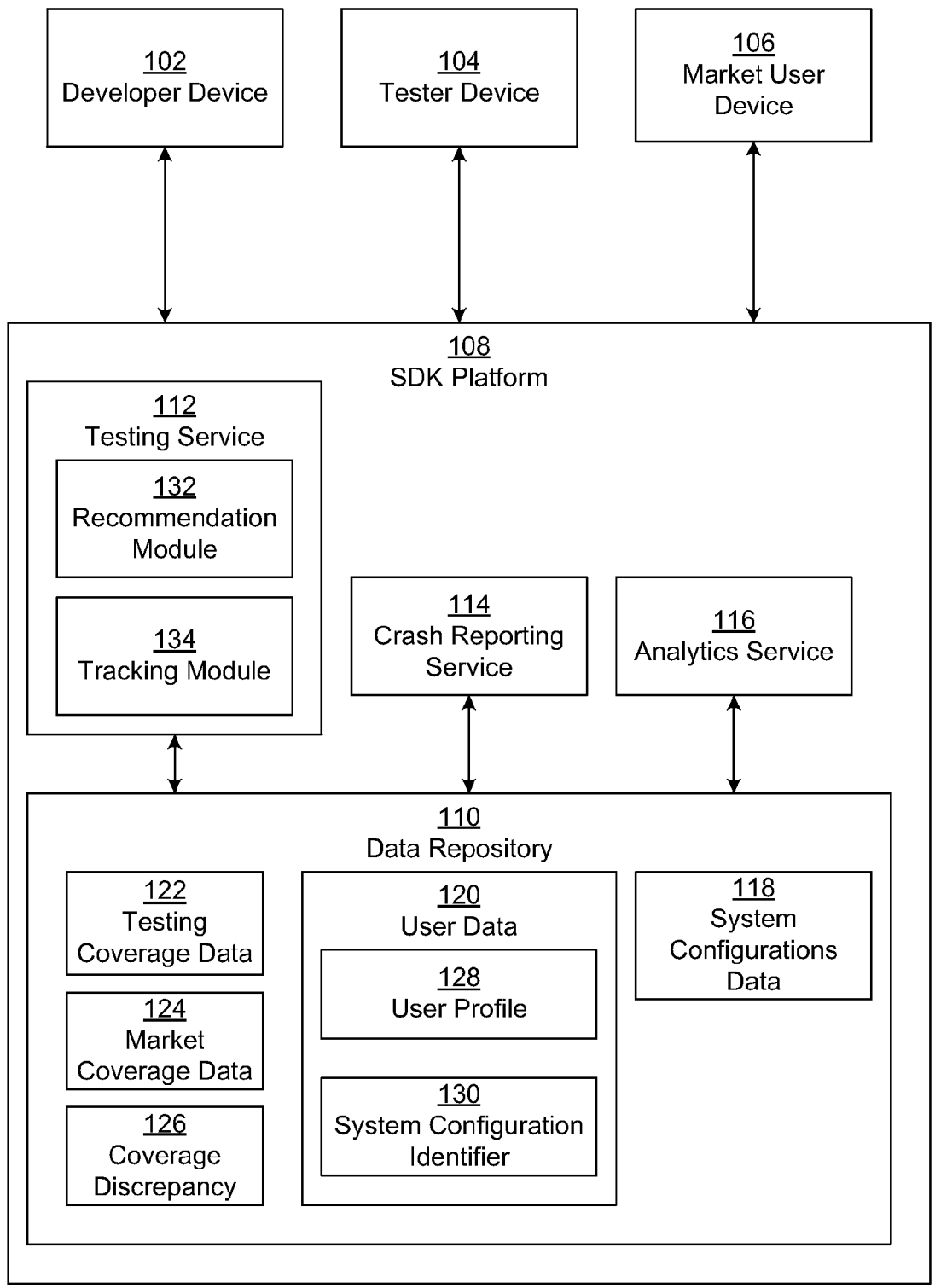
FIG. 1.1

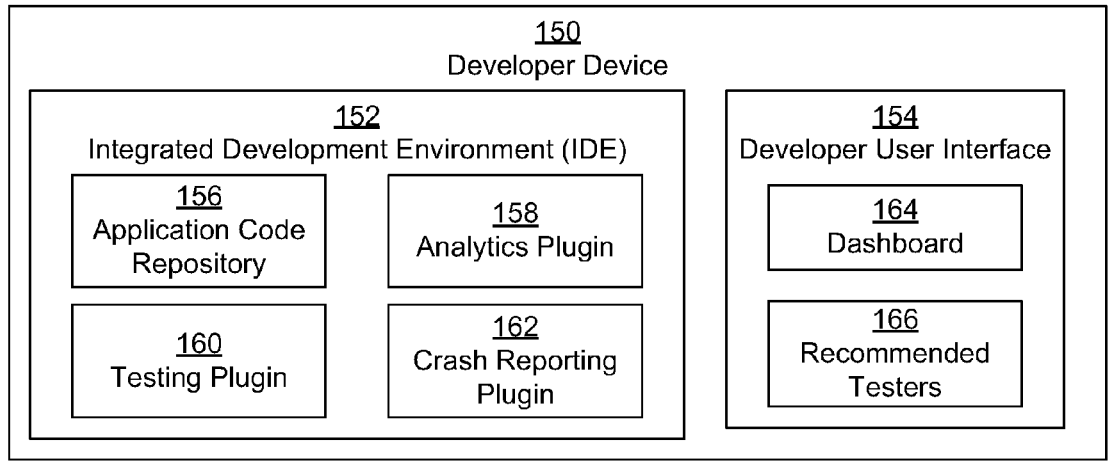
FIG. 1.2
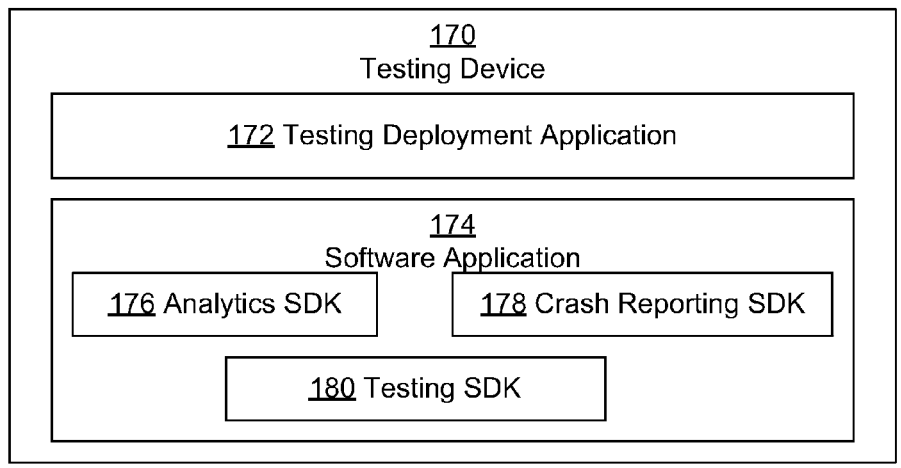
FIG. 1.3
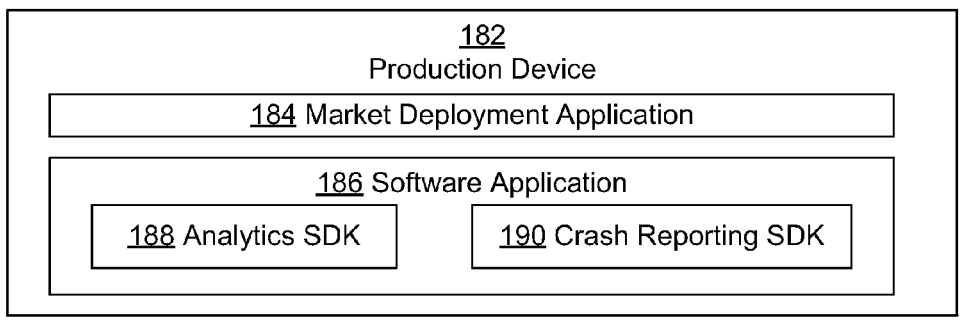
FIG. 1.4

METHOD AND SYSTEM FOR SOFTWARE APPLICATION TESTING RECOMMENDATIONS

BACKGROUND

The development and deployment of software applications is a multistage process. A software developer obtains or generates requirements documents listing the requirements of the software application and generates a software design based on the requirements documents. The software developer may then create the software application using the software design. The software is tested to identify any defects, and then deployed to a marketplace with the defects corrected.

SUMMARY

In general, in one aspect, embodiments relate to a method for application testing recommendation. The method includes deploying a software application to first testers having first system configurations, and receiving testing coverage data describing (i) a first subset of features of the software application being tested by the first testers and (ii) information describing the first system configurations. The method further includes deploying the software application to a marketplace, and receiving market coverage data describing (i) a second subset of features being used by market users and (ii) second system configurations of the market users. The method further includes comparing the market coverage data and the testing coverage data to identify a coverage discrepancy, selecting second testers to test the software application based on the coverage discrepancy, and deploying the software application to the second testers.

In general, in one aspect, embodiments relate to a system for software application testing recommendation. The system includes a computer processor, a data repository for storing information describing system configurations and testing coverage data. The system further includes a testing service configured to execute on the computer processor for deploying a software application to first testers having first system configurations. The system further includes analytics service configured to execute on the computer processor for receiving testing coverage data describing (i) a first subset of features of the software application being tested by the first testers and (ii) information describing the first system configurations, and receiving market coverage data describing (i) a second subset features being used by market users and (ii) second system configurations of the market users. The system further includes a recommendation module configured to execute on the computer processor for comparing the market coverage data and the testing coverage data to identify a coverage discrepancy, and selecting second testers to test the software application based on the coverage discrepancy.

In general, in one aspect, embodiments relate to a non-transitory computer readable medium for software application testing recommendation that includes computer readable program code. The computer readable program code is for deploying a software application to first testers having first system configurations, and receiving testing coverage data describing (i) a first subset of features of the software application being tested by the first testers and (ii) information describing the first system configurations. The computer readable program code is further for deploying the software application to a marketplace, and receiving market coverage data describing (i) a second subset of features being used by market users and (ii) second system configurations of the market users. The computer readable program code is further for comparing the market coverage data and the testing coverage data to identify a coverage discrepancy, selecting second testers to test the software application based on the coverage discrepancy, and deploying the software application to the second testers.

Other aspects of the invention will be apparent from the following description and the appended claims.

BRIEF DESCRIPTION OF DRAWINGS

FIGS. 1.1, 1.2, 1.3, and 1.4 show schematic diagram of a system in accordance with one or more embodiments of the invention.

DETAILED DESCRIPTION

Figure 2:
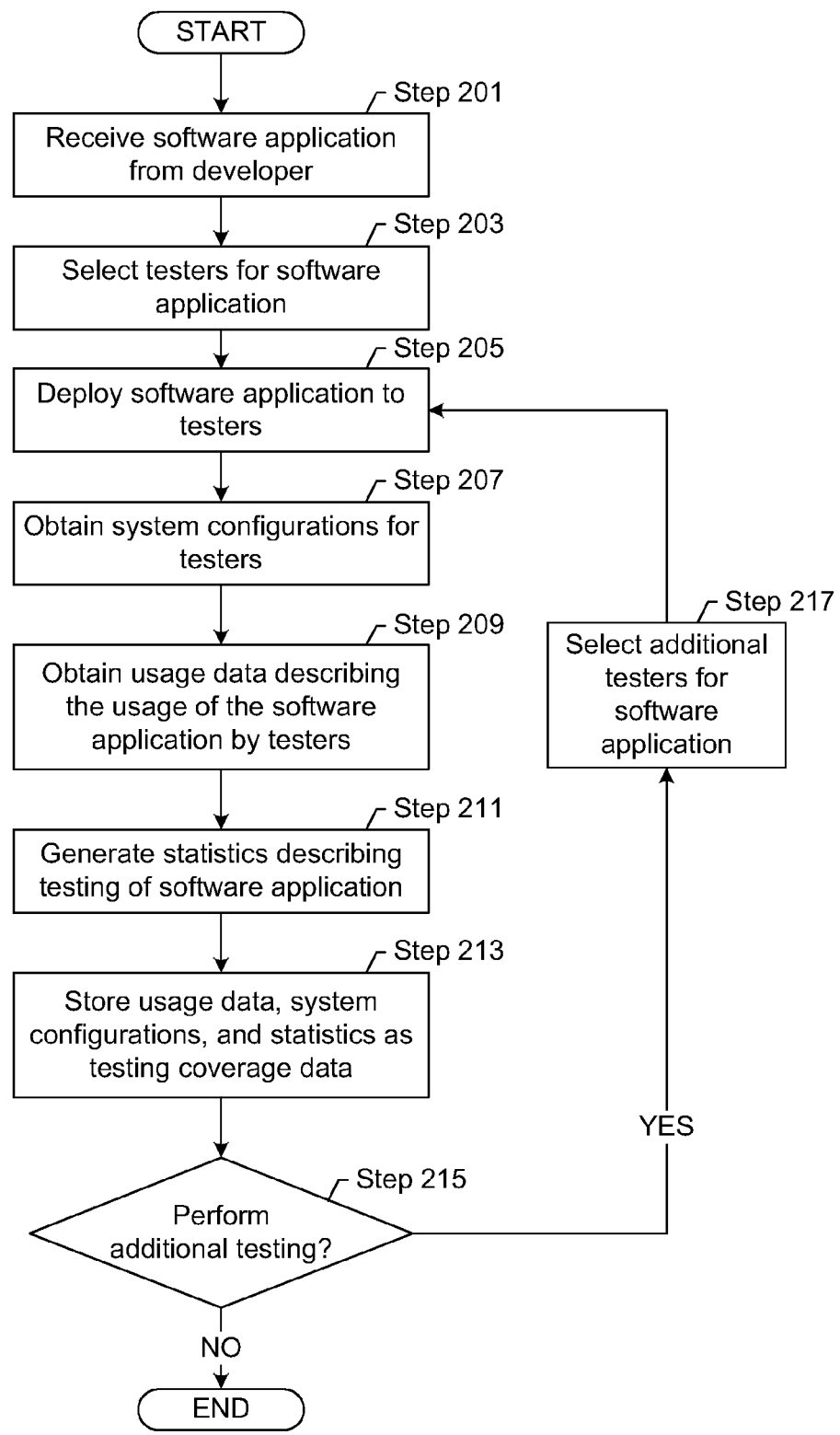
FIGS. 2-4 show flowcharts in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to management of testing of a software application. In particular, during testing, one or more embodiments obtain testing coverage data describing the testing of the software application. When the software application is deployed to the market, market coverage data that describes the usage of the software application is obtained. The market coverage data and testing coverage data may be compared to determine whether the testing of the software application matches usage of the software application. If the testing does not match usage, then one or more embodiments of the invention involve selecting additional testers and deploying the software application to the additional testers.

FIG. 1.1 shows a schematic diagram of a system in accordance with one or more embodiments of the invention. As shown in FIG. 1, the system includes developer devices (102), tester devices (104), production devices (106), and a software development kit (SDK) platform (108). As shown in FIG. 1, the developer devices (102), tester devices (104), and production devices (106) are operatively connected to the SDK platform (108). The connection between the various components may be wired and/or wireless, direct or indirect, temporary, permanent and/or intermittent, through a local area or wide area network, or have any other type of connection or a combination thereof. Further, additional and/or alternative connections may exist without departing from the scope of the invention. Each of the above components is described below.

Figure 6:
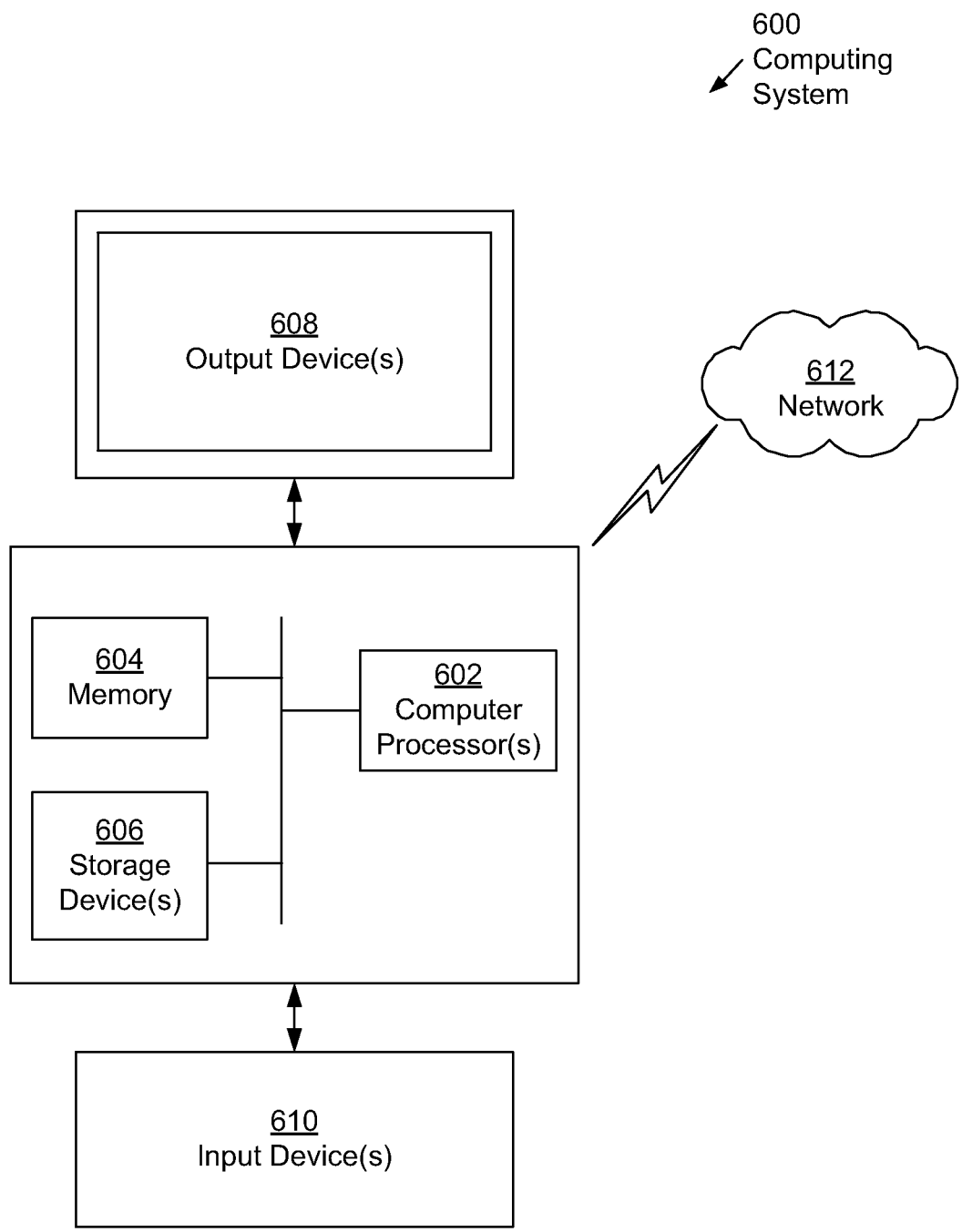
FIG. 6 shows a computing system in accordance with one or more embodiments of the invention.

In one or more embodiments of the invention, the developer devices (102), tester devices (104), and production devices (106) each correspond to any combination of hardware, software, and/or firmware, such as shown and discussed below with respect to FIG. 6. The developer devices (102), tester devices (104), and production devices (106) may correspond to a same type of device or to heterogeneous devices. Further, each of the aforementioned devices may correspond to a single device or multiple devices.

In one or more embodiments of the invention, a developer device is a device that is used by a developer to develop a software application (not shown and discussed below). A developer is a user or group of users that creates, updates, and/or manages the code of the software application. Further, a developer and developer device may be deemed to develop the software application when another entity (not shown) develops the software application for the developer, such as in a work for hire or agency relationship. In such a scenario, the developer device may only include functionality to request deployment and testing of the software application. Developer devices are discussed in further detail below and in FIG. 1.2. As shown in FIG. 1.1, the market may include functionality to interface with multiple developer devices, such as for different software applications (not shown).

The software application is any computer program product that is developed by a developer for release on an application market. The term software application may include different versions and/or editions of the same software application. In one or more embodiments of the invention, the software application includes multiple features. Each feature is a distinct attribute of the software application that is exposed to the end user (e.g., tester, market user). In other words, whereas software code segments are hidden from the end user, the features of the software application are identifiable to the end user. For example, a feature may be a displayed component in a graphical user interface, a particular functionality offered by the software application that is identifiable to the end user, or another aspect of the software application that is capable of being identified by the end user.

In one or more embodiments of the invention, tester devices (104) are devices for use by testers to test one or more software application. Tester devices are discussed in further detail below and in FIG. 1.3. Continuing with FIG. 1.1., a tester is a user or group of users that test the software application by executing the software application. Testing the software application may include a tester using the software application through intended use of the application by the market users and reporting any discovered defects. In such a scenario, the tester device may execute a prerelease of the software application or provide more defect information than market users. Such additional information may include comments when unexpected results occur, recommendations, and other information.

In general, a defect in the software application is any type of error in the software application. For example, a defect may be incorrect output generated from processing, crashing of the software application, slow execution time, or any other undesirable attribute of the software application.

In one or more embodiments, testing the software application may include one or more testers performing or attempting to perform exhaustive testing of all or part of the software application. In such a scenario, the tester device executes each feature of the software application using a variety of inputs in an effort to identify any defects. The selection of inputs and ordering of feature execution may be performed in an attempt to cover all scenarios that a market user may encounter.

Continuing with FIG. 1.1, the production devices (106) are devices used by market users of the software application. The production devices (106) may include functionality to locally and/or remotely execute the SDK platform. Production devices are discussed in further detail below and in FIG. 1.4. Continuing with FIG. 1.1, a market user is a customer of the software application. For example, the market user may be a purchaser of the software application and/or an entity that acquires general released version of the software application. Thus, whereas a tester expects defects in the software application, the market user may generally expect the software application to be free of defects. In other words, the market user uses the software application per the software application's intended use and not to identify defects.

Although FIG. 1.1 shows the developer device (102), tester devices (104), and production devices (106) as separate devices, one or more of the devices may be combined. For example, the developer device may be the same as the tester device when the developer both develops the software application and tests the software application. By way of another example, the developer device may be the same as the market user device when the developer both develops the software application and is an end user for the software application. Thus, the naming of the various devices in FIG. 1.1 denotes the role of the various devices with respect to a software application. For a different software application (not shown), the role may be different and, thus, the same device may be in one or more different categories.

As shown in FIG. 1.1., the developer devices (102), tester devices (104), and production devices (106) are connected to a software development kit (SDK) platform (108). In general, the SDK platform (108) corresponds to hardware, software, firmware, or a combination thereof that provides support services for SDKs. For example, the SDK platform may provide a marketplace for SDKs and provide server side services for executing SDKs. In other words, an SDK developer may create an SDK and send the SDK to the SDK platform. The SDK platform may provide SDK marketplace services, such that a software application developer may purchase or otherwise obtain the SDK and incorporate the SDK into a software application. An SDK is a set of software development tools that assists in the creation of software applications. The SDK may be the implementation of one or more application programming interfaces (APIs) in the form of libraries. The SDKs may be compiled and provided to the SDK platform.

In one or more embodiments of the invention, the SDK platform (108) may also provide an application marketplace for software applications. An application market is a virtual network space, supported by hardware and software that connects consumers of software applications to developers of software applications and facilitates the exchange of software applications. In at least some embodiments of the invention, the application market is a public market that is accessible via the Internet.

Continuing with the SDK platform (108), the SDK platform (108) includes a data repository (110), a testing service (112), a crash reporting service (114), and an analytics service (116). Each of these components are discussed below.

The data repository (110) is any type of storage unit and/or device (e.g., a file system, database, collection of tables, or any other storage mechanism) for storing data. Further, the data repository (110) may include multiple different storage units and/or devices. The multiple different storage units and/or devices may or may not be of the same type or located at the same physical site. The data repository (110) includes functionality to store system configurations data (118), user data (120), testing coverage data (122), market coverage data (124), and a coverage discrepancy (126).

In one or more embodiments of the invention, system configurations data (114) includes data describing the hardware and/or software configurations of the tester devices (104) and production devices (106). In other words, the system configuration data for a particular system may include identifying information about any program that may affect the execution of the software application and identifying information about the hardware. By way of an example, the system configuration data may include an operating system identifier, a device manufacturer name and model name, a web browser name, and any other identifying information of a system configuration. The system configuration data for a particular system configuration may include additional information, such as the functionality provided by the system configuration, components of the system configuration, known defects of the particular system configuration, other such information, or a combination thereof.

In one or more embodiments of the invention, user data (120) corresponds to data for a particular user (e.g., developer, tester, market user). User data (120) may include a user profile (128) and system configuration identifier (130). A user profile (128) includes information about a user. For example, the user profile (128) may include administrative information (e.g., name, address, email address, and other such information), market history information (e.g., financial account information to purchase on the market, identifiers of one or more applications and other goods purchased from the market), security information (e.g., account credentials, security questions for password reset, other security related information), or other information or a combination thereof. The system configuration identifier (130) is a reference to system configurations in the system configurations data (118). For example, the system configuration identifier (130) may include a unique identifier of the system configuration, whereby the system configuration data also includes the unique identifier. Rather than, or in addition to, having a separate system configurations data (118) and system configuration identifier (130), the system configurations data (118) may be a part of the user data (120). Further, although FIG. 1 shows user data (120) for a single user, user data for multiple users may exist, such that user data exists for each user of the market.

Continuing with the data repository (110), the testing coverage data (122) is data describing the amount of feature testing on different types of system configurations of the software application. In one or more embodiments of the invention, testing coverage data (120) includes processed and unprocessed data.

Unprocessed data is raw data that is gathered or detected from the tester device. For example, unprocessed data may include, for each system configuration in the tester system and each execution of the software application: an amount of time in which each feature is executed, identification of the subset of features executed, total amount of time of executing the software application, types of defects, number and types of defects per feature, number of defects per system configuration, core dumps (discussed below), information describing the execution environment in which a defect occurred, input causing the defect, and geographic region (e.g., city, state, county, etc.) of execution. The unprocessed data may also include the number of executions of the application, the number of executions per system configuration, and any other unprocessed data.

The binary core dump, which may also be referred to as a memory dump or system dump, includes the recorded state of the working memory of the application when the application crashed. Other key pieces of program state may also be included, such as the processor registers, which may include the program counter and stack pointer, memory management information, and other processor and operating system flags and information.

Processed data may include statistics about the unprocessed data. For example, processed data may include totals and proportions. The totals may include: total amount of time of execution of an application, total amount of time that an application is tested, total amount of time that the application executes per configuration, total amount of execution in a geographic region, total number of defects, and number of defects per type of defect. Proportional data, including represented as percentages, may include, for each feature, amount of time that the feature is executed as compared to a total amount of time of execution of the application. By way of another example, proportional data may include, for each system configuration, amount of time that the application executes on the system configuration as compared to a total amount of time of execution of the application. By way of another example, proportional data may include, for each geographic location, amount of time that the application executes at the geographic location as compared to a total amount of time of execution of the application. Other examples may include the above with accounting for the various types of defects.

The above discussion is only a few of the types of unprocessed and processed defects that may be stored in the testing coverage data (118). Additional and/or alternative processed and unprocessed data may be collected and/or exist without departing from the scope of the invention.

Further, a subset as used in this application includes all, part, or none. Thus, a subset of features of the software application may be all the features of the software application, part of the features of the software application, or none of the features of the software application.

Market coverage data (124) is data describing the amount of features usage on different types of system configurations of the software application. In one or more embodiments of the invention, market coverage data (124) may include processed and unprocessed data, such as the processed and unprocessed data described above with respect to the testing coverage data (122). In particular, the market coverage data (124) may include the same data discussed above, but with the usage by production devices rather than testing on tester devices.

For example, unprocessed market data may include, for each system configuration in the production system and each execution of the software application by a market user: an amount of time in which each feature is executed, identification of the subset of features executed, total amount of time of executing the software application, types of defects, number and types of defects per feature, number of defects per system configuration, core dumps, information describing the execution environment in which a defect occurred, input causing the defect, and geographic region (e.g., city, state, county, etc.) of execution. The unprocessed data may also include the number of executions of the application, the number of executions per system configuration, and any other unprocessed data of the market user. Processed data may include statistics about the unprocessed data for the market user. For example, processed data may include totals and proportions, such as the processed data discussed above, but for market users.

In one or more embodiments of the invention, coverage discrepancy (126) is a difference between the market coverage data (122) and testing coverage data (124). In other words, a coverage discrepancy may be any portion of the market coverage data (126) that is not in the testing coverage data (124). Thus, the coverage discrepancy (126) indicates the market usage exceeds the amount of testing. In some embodiments, the testing coverage data (122) may include additional testing than usage in the market without causing a coverage discrepancy. In one or more embodiments of the invention, the coverage discrepancy (126) may exist when the difference between a market coverage data item (i.e., a particular type of market coverage data) and the corresponding testing coverage data item satisfies a threshold. For example, if the threshold is 2% for the different in percentage of feature used, and feature X is tested 12% of all tests and used 13% of all market usage, a coverage discrepancy may not exist (i.e., 13%−11%=1% and 1%<2%).

Continuing with the SDK platform (108), in one or more embodiments of the invention, a crash reporting service (114) includes backend functionality for crash detection during the execution of the software application. For example, the crash reporting service (114) may include functionality to receive binary core dumps reports from an SDK in the software application, generate processed data items from the binary core dumps, and store unprocessed and processed data items from the binary core dumps. For example, the crash reporting service (114) may be configured to determine one or more crash data items from a binary core dump. The crash data items may include a method in the software application or third party SDK that generated an exception causing the crash, an API call by the compiled software application to the method, an input/parameter in the API call, a line or segment of code that caused the crash, or other information. Specifically, the crash reporting service (114) may determine crash data items from the binary core dump based on one or more desymbolication files that relate debugging symbols with the corresponding binary core dump to place the stack traces of the binary core dump in a format from which the crash data items may be determined.

The crash reporting service (114) may further include functionality to generate developer crash reports, which are presented to the developer. The developer crash reports is a presentation of processed and/or unprocessed data items (discussed above) about crashes of the software application. The developer defect report may include charts, graphs, and other user interface elements to simplify the presentation of crashes. Further, the developer defect report may be interactive, whereby a developer may select a data item in the developer defect report to view additional and/or more granular information about the data item. In one or more embodiments of the invention, the crash reporting service (114) and a corresponding crash reporting SDK (discussed below) may include functionality to perform at least some of the Steps of FIG. 2 discussed below.

In one or more embodiments of the invention, the analytics service (116) includes functionality to track the usage of the software application by the production devices (106). For example, the analytics service (116) may include functionality to provide backend support for capturing analytics regarding the usage of the software application. For example, the analytics service (116) may obtain testing coverage data (122) and market coverage data (124) describing how the software application is being used during testing and in production.

The analytics service (116) may further include functionality to generate developer usage reports, which are presented to the developer. The developer usage reports is a presentation of processed and/or unprocessed data items (discussed above) about the usage of the software application. The developer usage report may include charts, graphs, and other user interface elements to simplify the presentation of the usage of the software application. Further, the developer usage report may be interactive, whereby a developer may select a data item in the developer usage report to view additional and/or more granular information about the data item. In one or more embodiments of the invention, the analytics service (116) and a corresponding analytics SDK (discussed below) may include functionality to perform at least some of the Steps of FIG. 3 discussed below.

In one or more embodiments of the invention, the crash reporting service (114) and analytics service (116) are independent of each other and isolated from each other. In other words, the crash reporting service (114) may be a standalone service from the analytics service (116).

In one or more embodiments of the invention, the testing service (112) includes backend functionality to manage the testing of a software application. The testing service (112) may include a tracking module (132) and a recommendation module (134). The tracking module (132) includes functionality to monitoring the progress in testing the software application, and detecting defects during the execution of the software application. For example, the tracking module (132) may include functionality to receive defect reports from an SDK in the software application, generate processed data items from the defect reports, and store unprocessed and processed data items from the defect reports.

The recommendation module (134) may include functionality to generate recommendations for additional testing based on the testing coverage data (122) and the market coverage data (124). In other words, the recommendation module (134) may include functionality to identify a coverage discrepancy (124) and provide recommendations to correct the coverage discrepancy. For example, the recommendation module (134) may include functionality to perform the Steps of FIG. 4 discussed below.

The testing service (112) may further include functionality to generate information for display in a developer user interface (discussed below). Further, the testing service (112) may include functionality to interface, directly or indirectly, with the crash reporting service (114) and the analytics service (116).

FIG. 1.2 shows a schematic diagram of a developer device (150) in accordance with one or more embodiments of the invention. In one or more embodiments of the invention, the components of FIG. 1.2 may be implemented in hardware, software, firmware, or a combination thereof. As shown in FIG. 1.2, the developer device may include an integrated development environment (IDE) (152) and a developer user interface (154).

The IDE (152) is a collection of one or more tools that facilitates the development of a software application. For example, the tools in the IDE (152) may include tools, such as a code editor, compiler, debugger, and other tools used in the development of a software application. In one or more embodiments of the invention, the IDE (156) includes an application code repository (156), an analytics plugin (158), a testing plugin (160), and a crash reporting plugin (162). The application code repository (156) is a data repository for storing application source code, a compiled binary, intermediate object code, or any other type of code. The analytics plugin (158) is an extension to the IDE that connects to the analytics service, discussed above. The testing plugin (160) is an extension to the IDE that connects to the analytics service, discussed above. The crash reporting plugin (162) is an extension to the IDE that connects to the crash reporting service, discussed above. Each of the respective plugins may assist in adding a respective SDK to the software application and communicating with the corresponding service to obtain data from the service.

The developer user interface (154) is an interface (e.g., graphical user interface and/or application programming interface) for the developer device (150) to access the SDK platform. For example, the developer user interface (154) may include interface widgets and functionality to receive, directly or indirectly, from the developer, the software application, parameters for testing the software application, and parameters for deploying the software application in an application market. The developer user interface (154) may also include functionality to display results and recommendations based on the testing and deployment. In one or more embodiments of the invention, the developer user interface (132) includes a dashboard (142) and recommended testers (144).

The dashboard (142) includes charts, graphs, and other graphical user interface widgets to present analytics. The analytics may include the testing coverage data (118), the market coverage data (120), metrics describing a comparison of the testing coverage data (118) and the market coverage data (120), and any coverage discrepancies (122). The analytics in the dashboard (142) may also present a rank value that provides a measure of the quality of testing and/or amount of defects of the software application. For example the rank value may compare the software application with other software applications of the same developer and/or different developers.

In one or more embodiments of the invention, the developer user interface (132) may further include functionality to display recommendations, such as recommended testers (144) and other recommendations for updating the software application and testing. For example, the recommended testers (144) may be identification of particular testers (e.g., by username or other unique identifier of a tester). The recommendations for additional testing may include identification of a particular type or geographic location of testers, identification of system configurations, identification of features that should have additional testing, other recommendations for testing, or a combination thereof. The recommendations for updating the software may include general tips that are applicable to multiple software applications and/or specific tips for the particular software application. For example, the specific tips may include suggestions for changing the user interface of the software application, suggestions for increasing the execution speed of the software application, other suggestions, or a combination thereof.

FIG. 1.3 shows a schematic diagram of a tester device (170) in accordance with one or more embodiments of the invention. In one or more embodiments of the invention, the components of FIG. 1.3 may be implemented in hardware, software, firmware, or a combination thereof. As shown in FIG. 1.3, the tester device (170) may include a testing deployment application (172) and a software application (174).

The testing deployment application (172) is an application for testers to obtain the software application (174). For example, the testing deployment application (172) may include interface widgets and functionality to receive security credentials, and deploy the software application (174) to a tester device (170). The testing deployment application (172) may also include functionality to receive a ranking of the software application, comments regarding the software application, and private suggestions to the developer for improving the software application. In some embodiments, the testing deployment application (172) may be optional. For example, the tester device (170) may receive the software application (174) via email.

The software application (174) on the tester device is a version of the software application for testing. For example, the software application (174) may include an analytics SDK (176), a crash reporting SDK (178), and a testing SDK (180). The analytics SDK (176) includes functionality to gather data items regarding usage of the software application on the tester device (170) and transmit the data items to the analytics service (discussed above). The crash reporting SDK (176) includes functionality to gather core dumps from the software application crashing on the tester device (170) and transmit the core dumps to the crash reporting service (discussed above). The testing SDK (176) includes functionality to gather data items from detected defects in the software application on the tester device (170) and transmit the data items to the testing service (discussed above). As shown, each SDK is embedded and enabled in the software application, such that the SDK may gather the corresponding data items and report to the corresponding service.

FIG. 1.4 shows a schematic diagram of a production device (182) in accordance with one or more embodiments of the invention. In one or more embodiments of the invention, the components of FIG. 1.4 may be implemented in hardware, software, firmware, or a combination thereof. As shown in FIG. 1.4, the production device (182) may include a market deployment application (184) and a software application (186).

The market deployment application (184) is an application for market users to obtain the software application (186). For example, the market deployment application (184) may include interface widgets and functionality to receive security credentials, receive payment information, if applicable, and deploy the software application (186) to a production device (182). The market deployment application (184) may also include functionality to receive a ranking of the software application and reviews of the software application.

The software application (186) on the production device (182) is a version of the software application for use by the market user. For example, the software application (186) may include an analytics SDK (188) and a crash reporting SDK (190). The software application may optionally include a testing SDK (not shown), similar to the testing SDK discussed in reference to FIG. 1.3, that may be disabled. The analytics SDK (188) includes functionality to gather data items regarding usage of the software application on the production device (182) and transmit the data items to the analytics service (discussed above). The crash reporting SDK (190) includes functionality to gather core dumps from the software application crashing on the production device (182) and transmit the core dumps to the crash reporting service (discussed above). As shown, each SDK is embedded and enabled in the software application, such that the SDK may gather the corresponding data items and report to the corresponding service.

While FIGS. 1.1, 1.2, 1.3, and 1.4 show a configuration of components, other configurations may be used without departing from the scope of the invention. For example, various components may be combined to create a single component. As another example, the functionality performed by a single component may be performed by two or more components.

Figure 3:
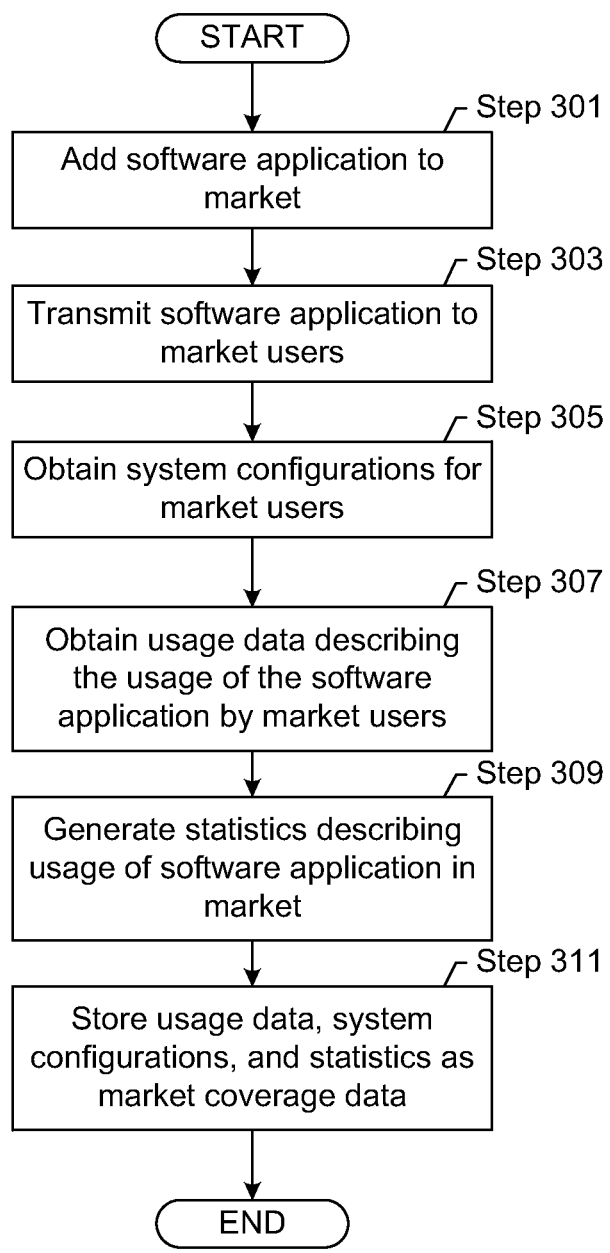
Figure 4:
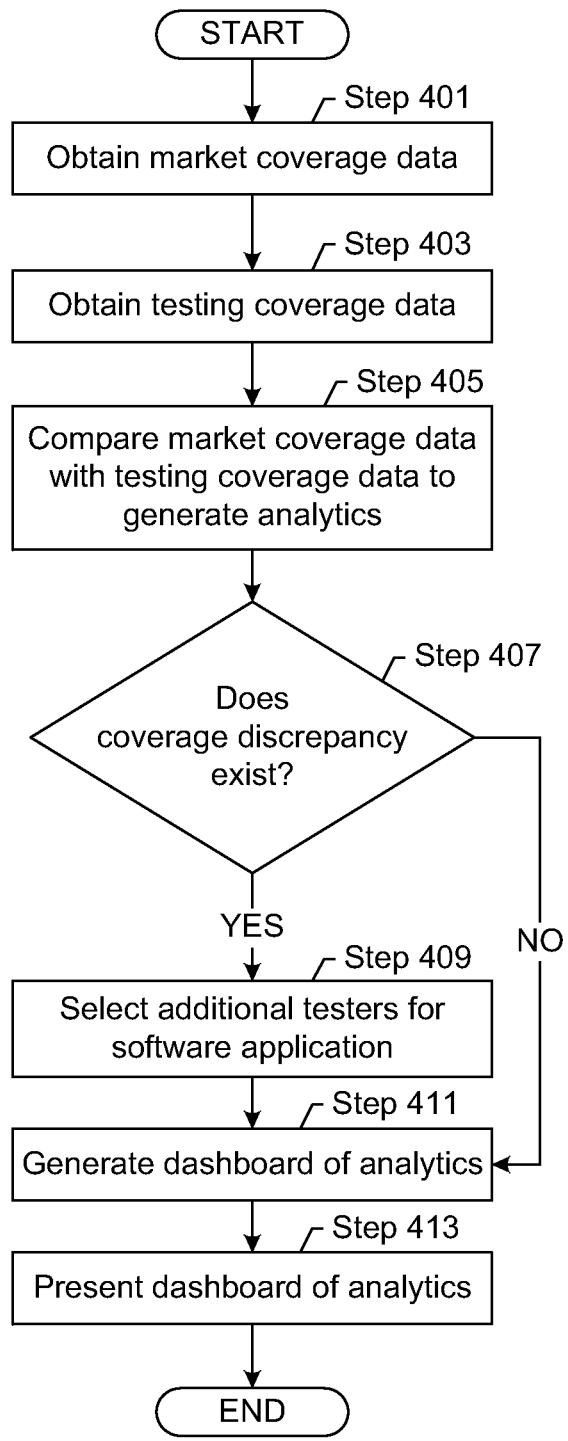

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for performing and tracking testing of a software application in accordance with one or more embodiments of the invention. In Step 201, a software application is received from a developer in accordance with one or more embodiments of the invention. For example, the developer may upload the software application to the market using the developer user interface. As another example, the software application may be retrieved by testers and/or market users directly from the developer device. In such a scenario, the developer may provide the SDK platform with information for accessing the software application from the developer device.

In Step 203, testers for the software application are selected in accordance with one or more embodiments of the invention. In one or more embodiments, the developer may select various options in the developer user interface that defines the group of testers. In one or more embodiments of the invention, the developer may select particular testers from a set of unique identifiers of testers. In one or more embodiments, the developer may select attributes of the various testers. For example, the developer may determine the target market users of the software application, determine the attributes of the target market users and market user devices, and select the attributes as the attributes for the testers. In such a scenario, the SDK platform may select particular testers and tester devices having matching attributes. If such particular testers do not exist in the market, the SDK platform may select particular testers having a threshold degree of similarity to the selected attributes. By way of a more concrete example, the developer may select a particular geographic region for testers, age range for testers, version of operating system, manufacturer and make of system, education level of testers, and any other relevant attributes (i.e., attributes having an effect on the use and execution of the software application) of the target market. Thus, the SDK platform may facilitate testing the software application in a same or similar environment as deployed in the market. In some embodiments of the invention, the SDK platform may initially select testers randomly.

In Step 205, the software application is deployed to the testers in accordance with one or more embodiments of the invention. In one or more embodiments of the invention, the testers may be registered testers that volunteer or are paid to test software applications. When a new software application is available for the tester to test, the SDK platform notifies the tester of the availability. For example, the notification may be performed via a message, a popup box, or any other technique for notifying a user of an event. Once the tester receives the notification, the tester may decide whether to install and test the software application in accordance with one or more embodiments of the invention. If the tester agrees to install and test the software application, then the tester may download, install, and/or begin execution of the software application.

In Step 207, system configurations for the testers performing the testing are obtained. For example, the system configurations may be obtained from the data repository if the tester device and the tester are registered. By way of another example, the system configurations may be obtained when transferring the software application to the tester device or when the tester device accesses the software application. Other techniques for obtaining the system configurations may be used without departing from the scope of the invention.

In Step 209, usage data describing the usage of the software application by the testers is obtained in accordance with one or more embodiments of the invention. In particular, while the tester and tester device are using the software application, the analytics SDK communicating with the analytics service may obtain various usage data describing the testing. The usage data that is gathered may include the unprocessed data discussed above with reference to FIG. 1.1. For example, to obtain time-based data, anytime that a tester starts the software application, the analytics service may start a timer. The analytics SDK communicating with the analytics service may also make note of the start and stop time of when the tester is using a particular feature. The geographic location may be determined using a global positioning system (GPS) receiver on the tester device, based on wireless networks, or using other techniques for identifying geographic location. Each time a defect is detected, the testing SDK may track the defect, including inputs and outputs to the defect, and send the information to the testing service. A tester may further note the defect in the software application or in a comments section with a note of input. Other techniques for gathering usage data may be used without departing from the scope of the invention.

In Step 211, statistics describing the testing of the software application are generated. Generating the statistics may be dependent on the type of statistics. For example, for proportional based statistics, the part divided by the total may yield the relevant proportion. Further, statistics may be generated by combining multiple sets of tests by different testers. In addition, at least some of the statistics may be generated by continually updating past statistics.

In Step 213, usage data, system configurations, and statistics are stored as testing coverage data in accordance with one or more embodiments of the invention. In one or more embodiments of the invention, the usage data, system configurations, and statistics are stored in the data repository and associated with the software application. The data may further be stored with an indication as to the particular edition and version of the software application that is being tested.

In Step 215, a determination may be made whether to perform additional testing in accordance with one or more embodiments of the invention. For example, based on the number of defects discovered, the developer may select to perform additional testing once the developer corrects the defects, including believing that the defects are corrected. Once deployed to market users, the developer may receive recommendations for performing additional testing, as discussed below with reference to FIG. 4, and, select to perform the additional testing.

If a determination is made to perform additional testing, then additional testers are selected for the software application in Step 217. Selecting the additional testers may be performed as discussed above with reference to Step 203. Further, selecting the additional testers may be based on determining the flaws of the original testing. The testers may be selected because the selected testers correct the flaws and make the entire testing complete. Once additional testers are selected, the flow may proceed to Step 205 to deploy the application on the tester devices of the original testers.

If a determination is made not to perform additional testing, then the flow may proceed to end. In one or more embodiments of the invention, at any time the developer may select to perform additional testing using the developer user interface.

FIG. 3 shows a flowchart for deploying an application to an application market and tracking usage of the application in the application market in accordance with one or more embodiments of the invention. In Step 301, the software application is added to the application market in accordance with one or more embodiments of the invention. In particular, the developer sets parameters for selling the software application on the market. For example, the developer may set the price of the software application, provide a title and description of the software application, request embedded advertisement tracking, perform other actions or a combination of actions to add the software application to the market. When an application market platform (i.e., platform that manages the application market) receives the software application, the application market platform may update the data repository with the version of the software application to put on the market or add a reference to the data repository to indicate that the software application should be generally available to the market. The application market platform may further update any indices to reference the existence of the software application.

In Step 303, the software application is transmitted to the market users in accordance with one or more embodiments of the invention. In one or more embodiments of the invention, when a new software application is available on the application market, the application market platform notifies the potential market users of the availability. For example, the notification may be in response to a search query from the market user for an attribute matching the software application or based on being a suggested software application for the market user. When a market user sees the software application, the market user may decide whether to install and execute the software application. If the market user decides to install and execute the software application, then the market user may download and/or begin execution of the software application. Over the course of time, the software application may be used by multiple market users having a variety of system configurations and using various subsets of features of the software application. Steps 305-311 discussed below present various steps that may be ongoing as new market users receive the software application.

In Step 305, system configurations for the market users that receive and execute the software application are obtained. For example, the system configurations may be obtained from the data repository if the market user device and the market user are registered. By way of another example, the system configurations may be obtained when transferring the software application to the market user device or when the market user device accesses the software application. Other techniques for obtaining the system configurations may be used without departing from the scope of the invention.

In Step 307, usage data describing the usage of the software application by the market users is obtained in accordance with one or more embodiments of the invention. In particular, while the market user and market user device are using the software application, the analytics SDK communicating with the analytics service may obtain various usage data describing the usage. The usage data that is gathered may include the unprocessed data discussed above with reference to FIG. 1.1. For example, to obtain time based data, anytime that a market user starts the software application, the analytics SDK communicating with the analytics service may start a timer. The analytics SDK communicating with the analytics service may also make note of the start and stop time of when the market user is using a particular feature. The geographic location may be determined using a geo positioning system (GPS) receiver on the market user device, based on wireless networks, or using other techniques for identifying geographic location. Other techniques for gathering usage data may be used without departing from the scope of the invention.

In Step 309, statistics describing the usage of the software application are generated. Generating the statistics may be dependent on the type of statistics. For example, for proportional based statistics, the part divided by the total may yield the relevant proportion. Further, statistics may be generated by combining multiple sets of usages by different market users. For example, at least some of the statistics may be generated by continually updating past statistics.

In Step 311, usage data, system configurations, and statistics are stored as market usage coverage data in accordance with one or more embodiments of the invention. In one or more embodiments of the invention, the usage data, system configurations, and statistics are stored in the data repository and associated with the software application. The data may further be stored with an indication as to the particular edition and version of the software application that is being used.

As discussed above, FIG. 3 may be ongoing. At various stages, a developer may decide to check with the SDK platform to determine how well the testing is reflective of the market usage. Alternatively or additionally, the SDK platform may transmit periodic or intermittent notifications to the developer based on detected defects, feedback from market users, and testing as compared the market usage.

FIG. 4 shows a flowchart for generating and presenting analytics and recommendations to a developer based on the testing and market usage in accordance with one or more embodiments of the invention. In Step 401, market coverage data is obtained in accordance with one or more embodiments of the invention. In one or more embodiments of the invention, the market coverage data may be obtained by the recommendation module directly or indirectly from the analytics service. For example, as the analytics service is generating the market coverage data, the analytics service may transmit the market coverage data to the recommendation module. By way of another example, the recommendation module may obtain the market coverage data from the data repository.

In Step 403, testing coverage data is obtained in accordance with one or more embodiments of the invention. In one or more embodiments of the invention, the testing coverage data may be obtained by the recommendation module directly or indirectly from the analytics service and tracking module. For example, as the tracking module and analytics service are generating the testing coverage data, the tracking module may transmit the testing coverage data to the recommendation module. By way of another example, the recommendation module may obtain the testing coverage data from the data repository.

In Step 405, the market coverage data is compared with testing coverage data to generate analytics in accordance with one or more embodiments of the invention. Comparing the market coverage data with the testing coverage data may be performed as follows. For each data item in the market coverage data, the matching data item in the testing coverage data is obtained. In one or more embodiments of the invention, for data items having a numerical value, generating the analytics may include calculating a difference between the data item in the testing coverage data and the market coverage data. Generating the analytics may also include determining whether the data item in the market coverage data is greater than, less than, or equal to the data item in the testing coverage data, and whether more than threshold amount of difference exists. For subjective data items or data items not having a numerical value, the data items may be mapped to a numerical value and compared.

As an alternative to or in addition to the above analysis, causal analysis may be performed. The causal analysis may include identifying negative feedback from market users, obtaining only the subset of market coverage data for the market users that provide the negative feedback, and comparing the subset of market user coverage data with the testing coverage data to determine data items in the testing coverage data that are less than the data items in the market coverage data. A similar causal analysis may be performed for any defects reported by market users by comparing only the subset of market coverage data surrounding the defect (e.g., the subset of market coverage data that was part of the execution environment when the defect occurred).

In Step 407, a determination is made whether a coverage discrepancy exists. As discussed above, a coverage discrepancy exists when a data item in the market coverage data is less than, by more than a threshold, the corresponding data item in the testing coverage data.

If a coverage discrepancy exists, the flow may proceed to Step 409 to select additional testers. For example, if the coverage discrepancy is with respect to the geographic location of the testers as compared to the market users, then the user profiles of testers are obtained to identify the particular testers that are in the geographic location of the market users. By way of another example, if the coverage discrepancy is with respect to the subset of features, then testers may be selected that use the subset of features or may be requested to use the subset of features.

By way of an example of Steps 405-409, consider the scenario where the data item is, for a particular system configuration, the proportion of the system configuration used by a user (e.g., market user or tester). In the example, the proportion of the particular system configuration used by the market users to the total market users is compared against the proportion of the particular system configuration used by the testers to the total testers to determine whether the proportion for the market users is greater than, less than, or equal to the proportion for the testers. Further, the amount of the difference may be determined. If the proportion for the market users is less than the proportion for the testers by more than a configurable threshold, then the recommendation module determines that a coverage discrepancy exists. Thus, the recommendation module may access the data repository and select particular testers having the particular system configuration and recommend the particular testers. If the proportion for the market users is greater than or equal to the proportion for the testers, the recommendation module may determine that no additional testing needs to be performed for the particular system configuration.

In Step 411, a dashboard of the analytics is generated in accordance with one or more embodiments of the invention. In one or more embodiments of the invention, the dashboard may be generated by populating a template with the generated analytics.

In Step 413, the dashboard is presented in accordance with one or more embodiments of the invention. For example, the dashboard may be displayed on a display device of the developer device, transmitted to the developer, or perform another technique for presenting the dashboard.

Figure 5:
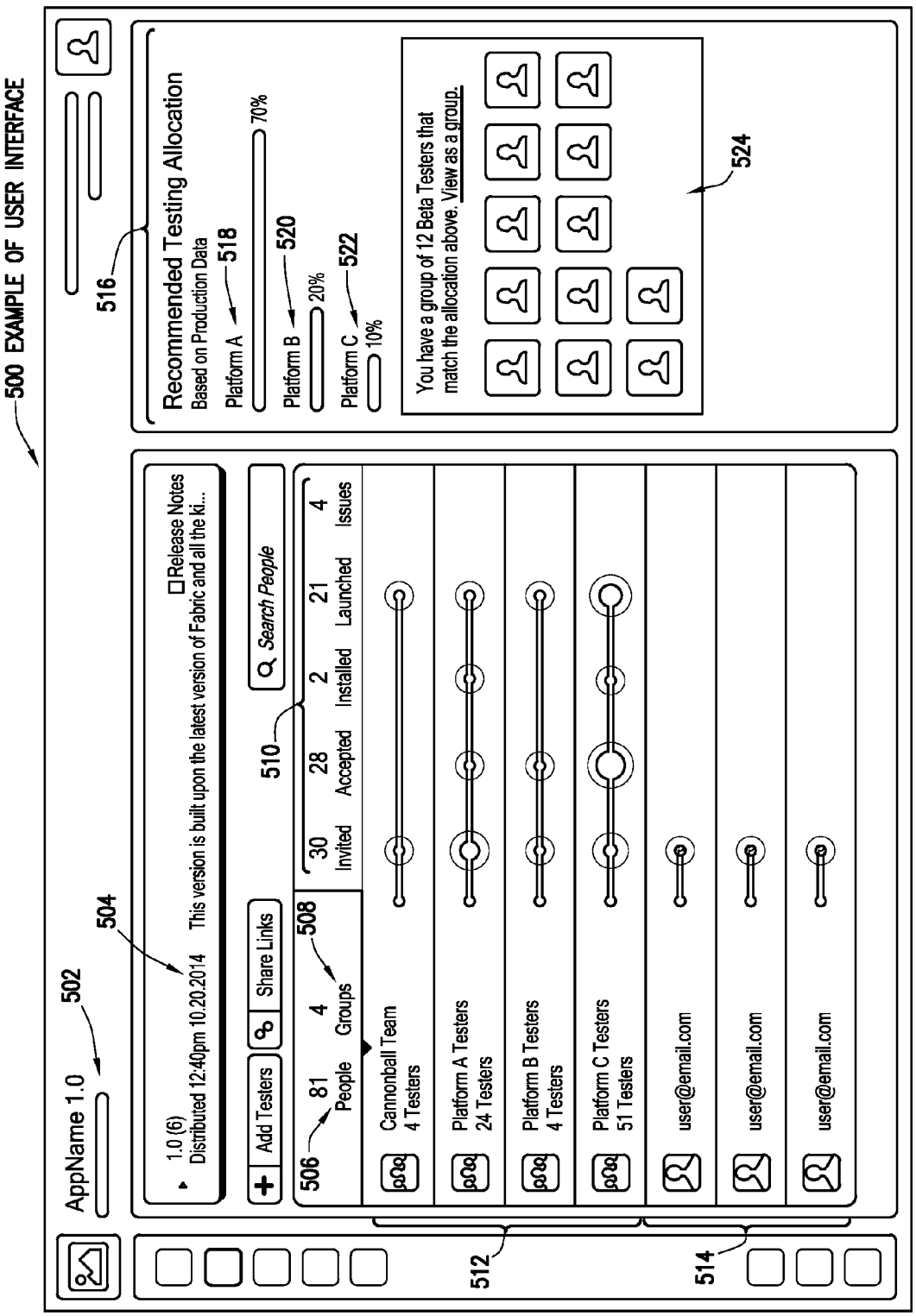
FIG. 5 shows an example in accordance with one or more embodiments of the invention.

The following example is for explanatory purposes only and not intended to limit the scope of the invention. FIG. 5 shows an example user interface dashboard in accordance with one or more embodiments of the invention. As shown in FIG. 6, the dashboard (502) may show the application name, information (504) about the distribution of the platform and a center section with testing. As shown in the center section 81 users (504) and 4 groups (508) are testing the application. The testing involves several stages (510) including being invited to the testing, accepting the invitation, installing the test version of the application, launching the test version, and discovering issues or defects in the application. Section (512) shows the four groups and a bar graph for each group indicating the stages of the corresponding group within the testing stages. The size of the circle in the bar graph shows the number of users in the respective stages. Section (514) shows individual users and a bar graph for each individual user. The bar graph for the individual user shows the current testing stage of the user.

Continuing with the example, the right section (516) of the example user interface (500) shows recommendations for testing based on testing coverage data and market coverage data. Based on a comparison of the testing coverage data to the market coverage data, the recommendation module recommends selecting testers having a distribution of 70% in platform A (518), 20% in platform B (520), 10% in platform C (522). Historical data may also be used to predict how testing should be performed when new platforms are released. For example, consider the scenario in which historical data indicates that 70% of users migrate to any new platform when released. In such a scenario, upon a detected release of a new platform, the recommendation module may recommend that 70% of the additional testing is on new platform. Further, the recommendation module may recommend a collection of testers to test the application. In particular, the example user interface (500) may show icons (524) of the recommended testers that satisfy the recommended distribution. In one or more embodiments of the invention, the developer may select a tester's icon in order to invite the tester to test the application. As shown in the example, one or more embodiments present a mechanism for assisting a developer in comprehensively testing an application based on the use of the software application in the market.

Embodiments of the invention may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for application testing recommendation, comprising:
   deploying a software application to a first plurality of testers having a first plurality of system configurations;
   receiving testing coverage data describing (i) a first subset of a plurality of features of the software application being tested by the first plurality of testers and (ii) information describing the first plurality of system configurations;
   deploying the software application to a marketplace;
   receiving, from an analytics software development kit (SDK) embedded in the software application, market coverage data describing (i) a second subset of the plurality of features of the software application being used by a plurality of market users and (ii) a second plurality of system configurations of the plurality of market users;
   comparing the market coverage data and the testing coverage data to identify a coverage discrepancy;
   selecting a second plurality of testers to test the software application based on the coverage discrepancy; and
   deploying the software application to the second plurality of testers.

2. The method of claim 1, wherein selecting the second plurality of testers comprises obtaining a unique identifier of each tester in the second plurality of testers.

3. The method of claim 1, wherein comparing the market coverage data and the testing coverage data comprises determining an overlap between the first plurality of system configurations and the second plurality of system configurations.

4. The method of claim 1, wherein comparing the market coverage data and the testing coverage data comprises:
   for each system configuration in the second plurality of system configurations:
      determining a first proportion of the system configuration used by the plurality of market users;
      determining a second proportion of the system configuration used by the plurality of testers; and
      determining whether the first proportion is within a threshold difference to the second proportion.

5. The method of claim 1, wherein comparing the market coverage data and the testing coverage data comprises determining whether the first subset of the plurality of features comprises the second subset of the plurality of features.

6. The method of claim 1, wherein comparing the market coverage data and the testing coverage data comprises:
   for each feature in the second subset of the plurality of features:
      determining a first proportion of the feature used by the plurality of market users to a total usage of the second subset of the plurality of features;
      determining a second proportion of the feature used by the plurality of testers to a total usage of the first subset of the plurality of features; and
      determining whether the first proportion is within a threshold difference to the second proportion.

7. The method of claim 1, further comprising:
   generating a dashboard for displaying a comparison of the market coverage data and the testing coverage data; and
   displaying the dashboard.

8. The method of claim 7, further comprising:
   generating a rating based on comparing the market coverage data and the testing coverage data; and
   incorporating the rating into the dashboard.

9. A system for software application testing recommendation, comprising:
- a computer processssor;
- a data repository for storing information describing a plurality of system configurations and testing coverage data; and
- a testing service configured to execute on the computer processor for:
  - deploying a software application to a first plurality of testers having a first plurality of system configurations,
  - an analytics service configured to execute on the computer processor for:
    - receiving testing coverage data describing (i) a first subset of a plurality of features of the software application being tested by the first plurality of testers and (ii) information describing the first plurality of system configurations, and
    - receiving, from an analytics software development kit (SDK) embedded in the software application, market coverage data describing (i) a second subset of the plurality of features of the software application being used by a plurality of market users and (ii) a second plurality of system configurations of the plurality of market users, and
- a recommendation module configured to execute on the computer processor for:
  - comparing the market coverage data and the testing coverage data to identify a coverage discrepancy, and
  - selecting a second plurality of testers to test the software application based on the coverage discrepancy.

10. The system of claim 9, further comprising:
a developer user interface configured to display a dashboard and the second plurality of testers.

11. The system of claim 9, wherein comparing the market coverage data and the testing coverage data comprises determining whether the first plurality of system configurations comprises the second plurality of system configurations.

12. The system of claim 9, wherein comparing the market coverage data and the testing coverage data comprises:
for each system configuration in the second plurality of system configurations:
  - determining a first proportion of the system configuration used by the plurality of market users;
  - determining a second proportion of the system configuration used by the plurality of testers; and
  - determining whether the first proportion is within a threshold difference to the second proportion.

13. The system of claim 9, wherein the testing service is further for:
receiving defect information from a testing software development kit (SDK) embedded in the software application deployed to the plurality of testers, and
adding the defect information to the testing coverage data.

14. The system of claim 9, wherein the testing coverage data received by the analytics service is received from the analytics SDK embedded in the software application.

15. A non-transitory computer readable medium for software application testing recommendation comprising computer readable program code, the computer readable program code for:
- deploying a software application to a first plurality of testers having a first plurality of system configurations;
- receiving testing coverage data describing (i) a first subset of a plurality of features of the software application being tested by the first plurality of testers and (ii) information describing the first plurality of system configurations;
- deploying the software application to a marketplace;
- receiving, from an analytics software development kit (SDK) embedded in the software application, market coverage data describing (i) a second subset of the plurality of features of the software application being used by a plurality of market users and (ii) a second plurality of system configurations of the plurality of market users;
- comparing the market coverage data and the testing coverage data to identify a coverage discrepancy;
- selecting a second plurality of testers to test the software application based on the coverage discrepancy; and
- deploying the software application to the second plurality of testers.

16. The non-transitory computer readable medium of claim 15, wherein comparing the market coverage data and the testing coverage data comprises determining whether the first subset of the plurality of features comprises the second subset of the plurality of features.

17. The non-transitory computer readable medium of claim 15, wherein comparing the market coverage data and the testing coverage data comprises:
for each feature in the second subset of the plurality of features:
  - determining a first proportion of the feature used by the plurality of market users to a total usage of the second subset of the plurality of features;
  - determining a second proportion of the feature used by the plurality of testers to a total usage of the first subset of the plurality of features; and
  - determining whether the first proportion is within a threshold difference to the second proportion.

18. The non-transitory computer readable medium of claim 15, further comprising computer readable program code for:
generating a dashboard describing comparing the market coverage data and the testing coverage data; and
displaying the dashboard.

19. The non-transitory computer readable medium of claim 18, further comprising computer readable program code for:
generating a rating based on comparing the market coverage data and the testing coverage data; and
incorporating the rating into the dashboard.

* * * * *